United States Patent
Park

(10) Patent No.: US 9,504,960 B2
(45) Date of Patent: Nov. 29, 2016

(54) EXHAUST GAS REDUCTION DEVICE FOR HEAVY EQUIPMENT

(75) Inventor: Cheol-Hyun Park, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 214 days.

(21) Appl. No.: 14/370,622

(22) PCT Filed: Jan. 6, 2012

(86) PCT No.: PCT/KR2012/000151
§ 371 (c)(1),
(2), (4) Date: Jul. 3, 2014

(87) PCT Pub. No.: WO2013/103169
PCT Pub. Date: Jul. 11, 2013

(65) Prior Publication Data
US 2014/0348716 A1    Nov. 27, 2014

(51) Int. Cl.
*B01D 53/94*    (2006.01)
*E02F 9/08*     (2006.01)
(Continued)

(52) U.S. Cl.
CPC ............. *B01D 53/94* (2013.01); *E02F 9/0866* (2013.01); *F01N 3/021* (2013.01); *F01N 3/2066* (2013.01);
(Continued)

(58) Field of Classification Search
None
See application file for complete search history.

(56) References Cited

U.S. PATENT DOCUMENTS 7,628,008 B2    12/2009  Ranalli
2008/0034739 A1  2/2008  Ranalli
(Continued)

FOREIGN PATENT DOCUMENTS

JP    2005-155404 A    6/2005
JP    2008-095597 A    4/2008
(Continued)

OTHER PUBLICATIONS

First Office Action issued by the State Intellectual Property Office of People's Republic of China (SIPO) on Nov. 3, 2015 regarding Application No. 201280066094.1 (with English translation) (11 pages).
(Continued)

*Primary Examiner* — Walter D Griffin
*Assistant Examiner* — Jelitza Perez
(74) *Attorney, Agent, or Firm* — Harness, Dickey & Pierce, P.L.C.

(57) ABSTRACT

An apparatus for reducing an exhaust gas for heavy equipment is provided, which can satisfy the intensified diesel engine exhaust gas regulation conditions through further providing of the selective catalytic reduction (SCR) device in addition to the diesel particulate filter (DPF), and minimize an influence of vibration due to engine driving through mounting of the diesel particulate filter (DPF) and the selective catalytic reduction (SCR) device on the cowl frame. The apparatus for reducing an exhaust gas includes a cowl frame mounted on one side of the main frame that is adjacent to the engine to reduce an influence due to vibration of the engine; a diesel particulate filter (DPF) having one end portion that communicates with the other end portion of the exhaust pipe and is mounted on an upper end portion of the cowl frame, provided with diesel oxidation catalyst (DOC) therein, and capturing particulate matters; a mixing pipe having one end portion that communicates with the other end portion of the diesel particulate filter, one side of which communicates with an injection device injecting a reducing agent; and a selective catalytic reduction (SCR) device mounted on an upper end portion of the cowl frame to communicate with the other end portion of the mixing pipe to accelerate a reduction reaction between the injected reducing agent and nitrogen oxides (NOx) in the exhaust gas.

3 Claims, 2 Drawing Sheets

(51) Int. Cl.
 *F01N 3/021* (2006.01)
 *F01N 3/20* (2006.01)
 *F01N 13/18* (2010.01)

(52) U.S. Cl.
 CPC ....... *F01N 13/1805* (2013.01); *F01N 13/1811* (2013.01); *F01N 13/1822* (2013.01); *F01N 2260/00* (2013.01); *F01N 2260/10* (2013.01); *F01N 2590/08* (2013.01); *Y02T 10/24* (2013.01)

(56) References Cited

U.S. PATENT DOCUMENTS

| | | | |
|---|---|---|---|
| 2010/0031644 A1 | 2/2010 | Keane et al. | |
| 2010/0187383 A1* | 7/2010 | Olsen | F01N 13/1805 248/201 |
| 2011/0079003 A1 | 4/2011 | Sun et al. | |
| 2012/0247861 A1* | 10/2012 | Mizuno | B60K 13/04 180/296 |

FOREIGN PATENT DOCUMENTS

| | | |
|---|---|---|
| JP | 2008-527245 | 7/2008 |
| JP | 2008-240695 A | 10/2008 |
| JP | 2009-079422 A | 4/2009 |
| JP | 2009-167806 A | 7/2009 |
| JP | 2009-184558 A | 8/2009 |
| KR | 10-2007-0088605 A | 8/2007 |
| KR | 20-0437371 Y1 | 11/2007 |
| KR | 10-2010-0068523 A | 6/2010 |
| KR | 10-2011-0033657 A | 3/2011 |
| WO | WO-2011-152306 A1 | 12/2011 |

OTHER PUBLICATIONS

International Search Report (in Korean and English) and Written Opinion (in Korean) for PCT/KR2012/000151, mailed Sep. 27, 2012; ISA/KR.

\* cited by examiner

EXHAUST GAS REDUCTION DEVICE FOR HEAVY EQUIPMENT

TECHNICAL FIELD

The present invention relates to an apparatus for reducing an exhaust gas for heavy equipment. More particularly, the present invention relates to an apparatus for reducing an exhaust gas for heavy equipment, which can satisfy the intensified diesel engine exhaust gas regulations through further providing of a selective catalytic reduction (SCR) device in addition to a diesel particulate filter (DPF), and minimize an influence of vibration due to engine driving through mounting of the diesel particulate filter (DPF) and the selective catalytic reduction (SCR) device on a cowl frame.

BACKGROUND ART

In general, a diesel engine is a device that converts thermal energy into mechanical energy using a mixed gas of outside air and diesel fuel that is a kind of fuel as working fluid, and the mixed gas explosively burnt in a cylinder becomes exhaust gas to be discharged to an outside. In this case, a pipe that is connected to an exhaust port to discharge the exhaust gas to the outside corresponds to an exhaust pipe. The exhaust gas includes materials of carbon dioxide, monoxide, hydrocarbon, sulfur oxide, hydrogen sulfide, nitrogen oxide, ammonia, ozone, and oxidant, and if they are discharged in the atmosphere as they are, environmental pollution is generated. However, with the technical progress of diesel engines and apparatuses for reducing an exhaust gas, the discharge amount of harmful gases has been considerably reduced.

However, in order to solve environmental problems related to the global warming, ozone concentration in the atmosphere, and the like, the environmental standards for harmful gases that are discharged from vehicles have been gradually intensified, and particularly in the case of heavy equipment, the harmful gas discharge standards have been further intensified.

Accordingly, in the case of heavy equipment including an excavator in the related art, in order to satisfy Tier-4 Interim and Stage-IIIB that are diesel engine exhaust gas regulations, a diesel particulate filter (DPF) having diesel oxidation catalyst (DOC) provided therein is connected to a diesel engine exhaust port to oxidize monoxide (CO) and hydrocarbon (HF) and to collect particulate matters.

However, in the case of Tier-4 Final or Stage-IV to be intensified in future, regulations to reduce nitrogen oxide (NOx) are further intensified, and thus it is difficult to satisfy them using the current diesel particulate filter (DPF) only.

Further, unlike mufflers of general vehicles, the diesel particulate filter (DPF) in the related art is heavy, and if the DPF is directly mounted on an engine in spite that the filter provided therein is very vulnerable to vibrations, welded portions of the diesel particulate filter (DPF) are directly affected by vibrations due to engine driving and work loads to cause the occurrence of deformation, such as crack or damage.

DISCLOSURE

Technical Problem

Therefore, the present invention has been made to solve the above-mentioned problems occurring in the related art, and one subject to be achieved by the present invention is to provide an apparatus for reducing an exhaust gas for heavy equipment, which can satisfy the intensified diesel engine exhaust gas regulations (reduce nitrogen oxide) through further providing of a selective catalytic reduction (SCR) device in addition to a diesel particulate filter (DPF).

Another subject to be achieved by the present invention is to provide an apparatus for reducing an exhaust gas for heavy equipment, which can minimize an influence of vibration due to engine driving through mounting of the diesel particulate filter (DPF) and the selective catalytic reduction (SCR) device on a cowl frame.

Technical Solution

In accordance with an aspect of the present invention, an apparatus for reducing an exhaust gas that is provided on one end portion of an exhaust pipe of which the other end portion is connected to an engine mounted on a main frame of heavy equipment, includes a cowl frame mounted on one side of the main frame that is adjacent to the engine to reduce an influence due to vibration of the engine; a diesel particulate filter (DPF) having one end portion that communicates with the other end portion of the exhaust pipe and is mounted on an upper end portion of the cowl frame, having diesel oxidation catalyst (DOC) provided therein, and capturing particulate matters; a mixing pipe having one end portion that communicates with the other end portion of the diesel particulate filter, one side of which communicates with an injection device injecting a reducing agent; and a selective catalytic reduction (SCR) device mounted on an upper end portion of the cowl frame to communicate with the other end portion of the mixing pipe to accelerate a reduction reaction between the injected reducing agent and nitrogen oxides (NOx) in the exhaust gas.

The diesel particulate filter (DPF) and the selective catalytic reduction (SCR) device may be cylindrical, may have both end portions which are in hemispheric shapes that are opposed to each other, and may be mounted in parallel on the cowl frame.

At least one of the exhaust pipe and the mixing pipe may have a connection portion that is connected by one or more flexible joints.

Engagement of the cowl frame with the diesel particulate filter (DPF) and the selective catalytic reduction (SCR) device may be performed through a fixing portion that includes an elastic support member fixed to the upper end portion of the cowl frame to support lower end portions of the diesel particulate filter (DPF) and the selective catalytic reduction (SCR) device, and fastening bands provided on both end portions of the support member to surround and fix outer peripheries of the diesel particulate filter (DPF) and the selective catalytic reduction (SCR) device.

Advantageous Effect

The apparatus for reducing an exhaust has for heavy equipment according to an embodiment of the present invention as configured above has the following effects.

Since the selective catalytic reduction (SCR) device is further provided in addition to the diesel particulate filter (DPF) that is a reduction device to remove nitrogen oxide (NOx), the intensified diesel engine exhaust gas regulations can be satisfied, and the environmental pollution can be prevented.

Further, since the diesel particulate filter (DPF) and the selective catalytic reduction (SCF) device are mounted on the upper end portion of the cowl frame that is adjacent to the engine, the influence of the vibration due to the engine driving can be minimized, and thus the durability of the reduction device can be increased.

Further, since the diesel particulate filter (DPF) and the selective catalytic reduction (SCR) device are cylindrical and have both end portions which are in hemispheric shapes that are opposed to each other, impacts due to the exhaust gas that flows in at high temperature and at high pressure can be effectively buffered, and thus the durability is increased.

Further, since at least one of the exhaust pipe and the mixing pipe has the connection portion that is connected by at least one flexible joint, and the elastic support members are provided on the lower end portions of the diesel particulate filter (DPF) and the selective catalytic reduction (SCR) device, the vibration due to the engine driving can be reduced more effectively.

BRIEF DESCRIPTION OF THE DRAWINGS

The above objects, other features and advantages of the present invention will become more apparent by describing the preferred embodiments thereof with reference to the accompanying drawings, in which.

DESCRIPTION OF REFERENCE NUMERALS IN THE DRAWING

Figure 1:
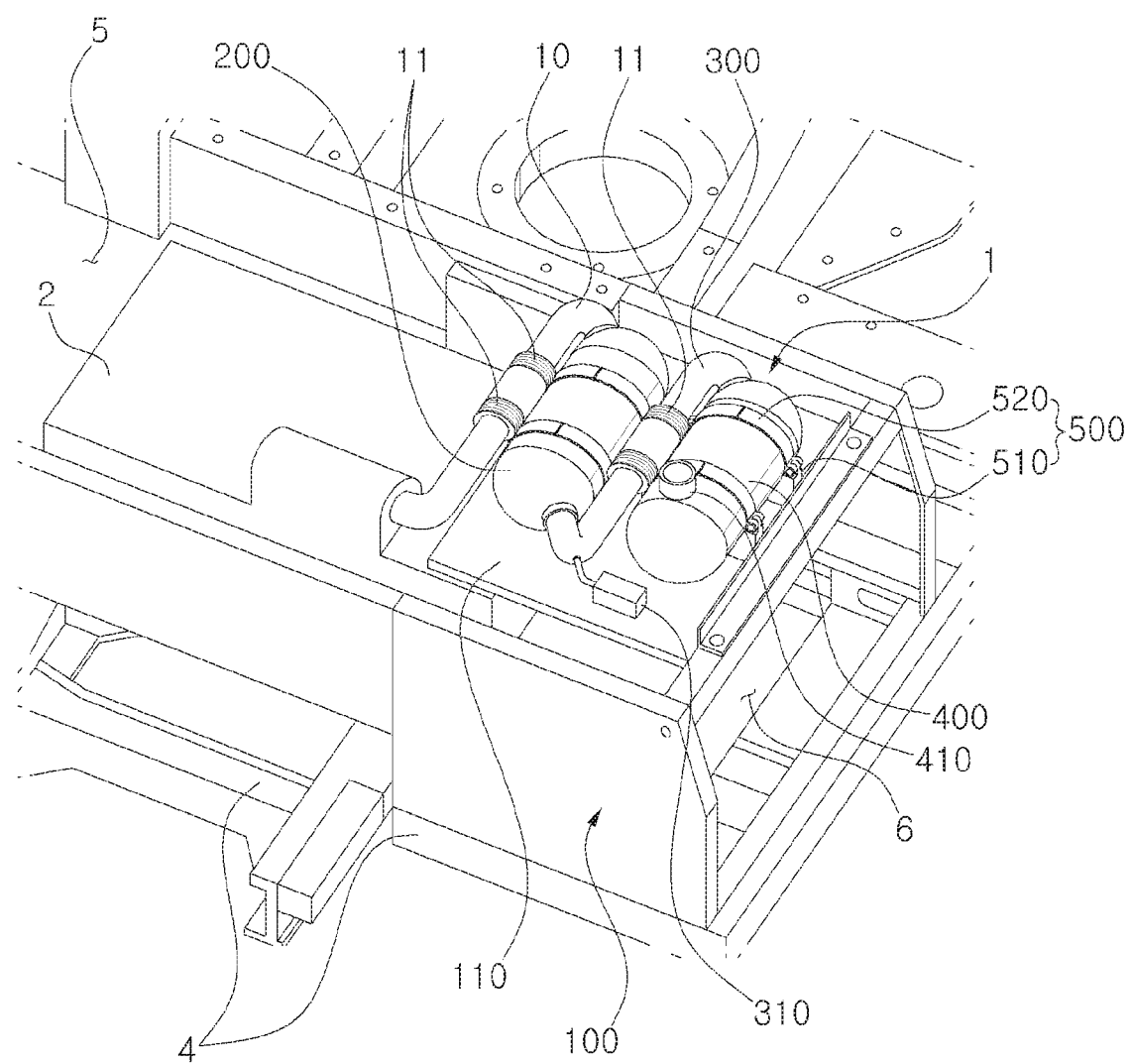
FIG. 1 is a perspective view illustrating a mount state of an apparatus for reducing an exhaust gas for heavy equipment according to an embodiment of the present invention.

1: apparatus for reducing an exhaust gas for heavy equipment
2: engine
4: main frame
5: engine room
6: pump room
10: exhaust pipe
11: flexible joint
100: cowl frame
110: fixing bracket
200: diesel particulate filter (DPF)
300: mixing pipe
310: injection device
400: selective catalytic reduction (SCR) device
410: discharge pipe
500: fixing portion
510: support member
520: fastening band

BEST MODE

Hereinafter, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 2:
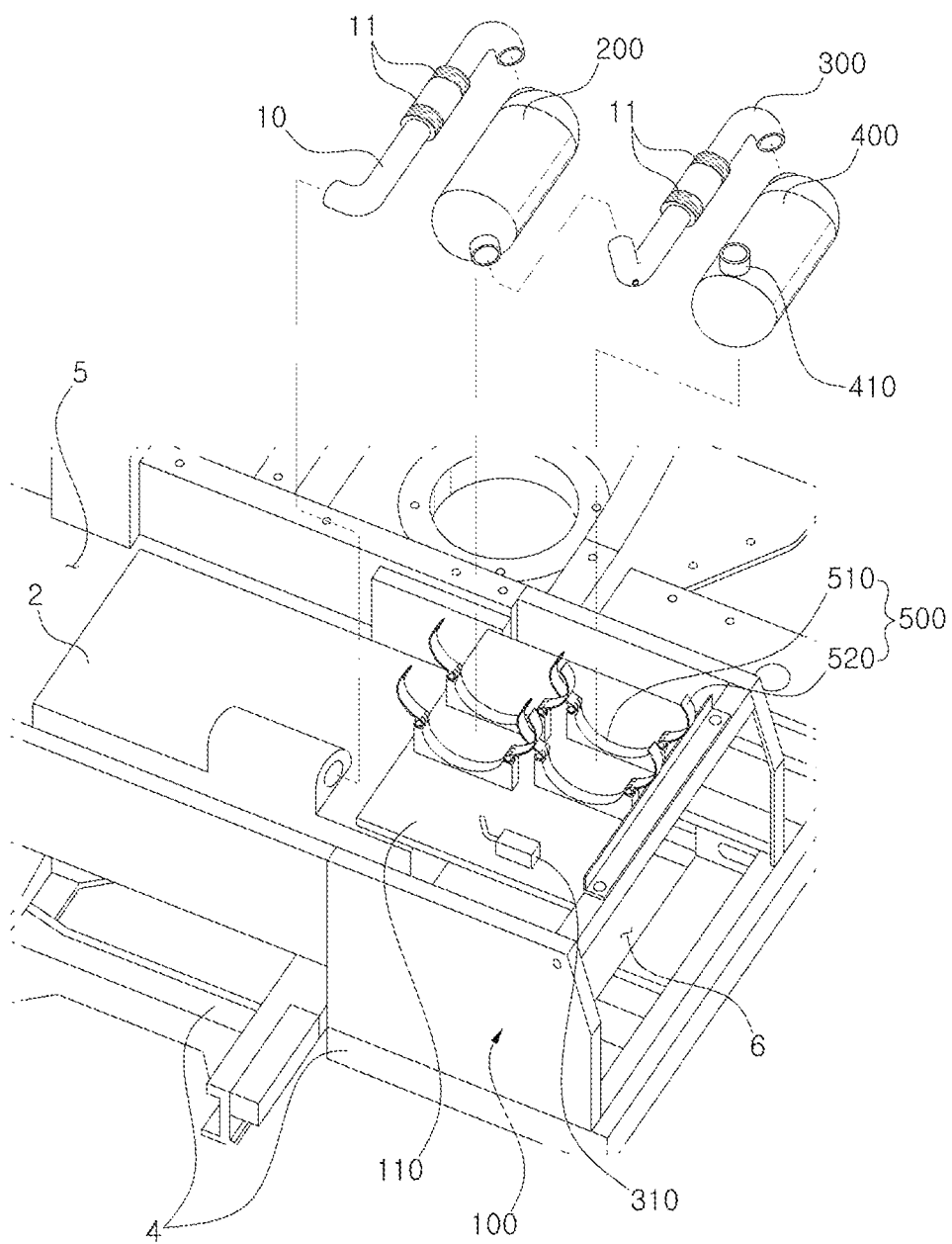
FIG. 2 is an exploded perspective view of an apparatus for reducing an exhaust gas for heavy equipment according to an embodiment of the present invention.

FIG. 1 is a perspective view illustrating a mount state of an apparatus for reducing an exhaust gas for heavy equipment according to an embodiment of the present invention, and FIG. 2 is an exploded perspective view of an apparatus for reducing an exhaust gas for heavy equipment according to an embodiment of the present invention.

As illustrated in FIGS. 1 and 2, an apparatus 1 for reducing an exhaust gas for heavy equipment is an apparatus that reduces harmful gas included in the exhaust gas of a diesel engine and discharges the exhaust gas in the atmosphere, and may be provided on one end portion of an exhaust pipe 10 of which the other end portion is connected to an engine 2 mounted on a main frame 4 of heavy equipment.

The apparatus 1 for reducing an exhaust gas for heavy equipment may briefly include a cowl frame 100, a diesel particulate filter (DPF) 200, a mixing pipe 300, and a selective catalytic reduction (SCR) device 400.

Here, the cowl frame 100 is a constituent element that partitions an engine room 5 and a pump room 6 of the heavy equipment and provides a space so that the diesel particulate filter (DPF) 200 and the selective catalytic reduction (SCR) device 400 can be mounted on an upper end portion of the cowl frame 100. The cowl frame 100 is installed on one side of the main frame 4 that is adjacent to the engine 2, and thus vibration that is generated according to driving of the engine 2 is not directly transferred to the cowl frame 100.

The cowl frame 100 can be variously modified so far as it has a structure that can perform the above-described functions and can be mounted on the main frame 4.

In this case, the cowl frame 100 may be mounted on the main frame by bolt fastening or welding.

After a fixing bracket 110 is engaged with an upper end portion of the cowl frame 100, the diesel particulate filter (DPF) 200 and the selective catalytic reduction (SCR) device 400 to be described later may be mounted thereon. In this case, if the fixing bracket 110 is installed so as to cover the upper end portion of the cowl frame 100, the pump room 6 and the engine room 5 provided on the lower side are sealed up to be separated from each other. Accordingly, even if hydraulic fluid leaks due to malfunction or trouble of the pump room 6, the engine is prevented from coming in contact with the hydraulic fluid and thus a fire can be prevented from occurring.

The diesel particulate filter (DPF) 200 operates to oxidize HC and CO in the exhaust gas through the diesel oxidation catalyst (DOC) provided on the inside and to capture particulate matters PM, and thus corresponds to a constituent element that replaces a muffler in the related art. Since the diesel particulate filter (DPF) 200 has one end portion that communicates with the other end portion of the exhaust pipe 10 and is mounted on the upper end portion of the cowl frame 100, it corresponds to a reduction device through which the exhaust gas that is discharged from the engine 2 first passes.

The diesel particulate filter (DPF) 200 may be manufactured with various sizes and shapes according to an engine output and an amount of exhaust gas. As illustrated in FIGS. 1 and 2, in order to effectively buffer impact due to the exhaust gas that flows in at high temperature and at high pressure, it is preferable that the diesel particulate filter (DPF) 200 is in a cylindrical shape, and has both end portions which are in hemispheric shapes that are opposed to each other. That is, the cross section of the diesel particulate filter (DPF) 200 is in an elliptical shape.

Since the diesel particulate filter (DPF) 200 is not mounted on the engine 2, but is installed on the upper end portion of the cowl frame 100 that is mounted on one side of the main frame 4 that is adjacent to the engine 2, it is hardly affected by the vibration due to the engine driving and work load. Accordingly, a welded portion of the diesel particulate filter (DPF) 200 or a connection portion of the exhaust pipe 10 can be prevented from being deformed, such as from being cracked or damaged, due to the vibrations.

The diesel particulate filter (DPF) 200 and the upper end portion of the cowl frame 100 may be engaged with each other by a fixing portion 500. The fixing portion 500 may include an elastic support member 510 fixed to the upper end portion of the cowl frame 100 (specifically, an upper surface of the fixing bracket 110) to support a lower end portion of the diesel particulate filter (DPF) 200, and fastening bands 520 provided on both end portions of the support member 510 to surround and fix outer peripheries of the diesel particulate filter (DPF) 200.

In this case, the support member 510 has a shape that corresponds to the outer periphery of the lower end portion of the supported diesel particulate filter (DPF) 200, and comes in close contact with the diesel particulate filter (DPF) 200. The support member 510 may be formed of heat resistant synthetic resin having elasticity to reduce the vibration due to the engine driving. At least two support members 510 may be provided to stably support the diesel particulate filter (DPF) 200.

A pair of fastening bands 520 may be provided to surround and fix the outer periphery of the diesel particulate filter (DPF) 200, and may be rotated through a hinge engagement with both end portions of the support member 510. Mutual engagement of the pair of fastening bands 520 may be performed by various engagement methods, such as screw engagement. The diesel particulate filter (DPF) 200 can be firmly fixed to the support member 510 through the fastening bands 520.

On the other hand, in order to effectively reduce the vibration due to the engine driving and to prevent deformation according to thermal expansion, a connection portion that is connected by at least one flexible joint may be provided on one side of the exhaust pipe 10. It is preferable that a proper number of flexible joints is provided in consideration of the length of the exhaust pipe 10 and the degree of the engine vibration. On the other hand, the flexible joint 11 may be made of metal or heat resistant elastic body.

The diesel oxidation catalyst (DOC) that is provided inside the diesel particulate filter (DPF) 200 may be made of platinum (Pt), palladium (Pd), or metal including them at a predetermined rate, and the inner side surface of the diesel particulate filter (DPF) 200 may be coated with the diesel oxidation catalyst (DOC) to accelerate oxidation of HC and CO.

Further, the diesel oxidation catalyst (DOC) may be provided inside the diesel particulate filter (DPF) 200 so that a honeycomb-shaped porous member (catalyst substrate) having a plurality of through-holes that are formed in parallel to the flow of the exhaust gas is coated with the diesel oxidation catalyst (DOC), and thus the contact area with the exhaust gas may be greatly increased. Through this, the catalytic function is improved, and oxidation reaction of HC and CO occurs in a wide range. As a result, HC and CO can be effectively reduced.

The diesel particulate filter (DPF) 200 captures particulate matters PM included in the exhaust gas that is discharged from the engine 2, and the captured particulate matters PM are periodically burnt to be removed. The exhaust gas that has passed through the diesel particulate filter (DPF) 200 flows into the mixing pipe 300.

The mixing pipe 300 is a constituent element that makes the diesel particulate filter (DPF) 200 and the selective catalytic reduction (SCR) device 400 communicate with each other, and is a place where one side of the mixing pipe 300 communicates with an injection device 310 to inject a reducing agent to the inside. The mixing pipe 300 is a pipe-shaped member having one end portion that communicates with the other end portion of the diesel particulate filter (DPF) 200 and the other end portion that communicates with the selective catalytic reduction (SCR) device 400.

In this case, the injected reducing agent perform chemical reaction with nitrogen oxide included in the exhaust gas that has passed through the diesel particulate filter (DPF) 200 to reduce the nitrogen oxide, and urea or ammonia ($NH_3$) may be mainly used as the reducing agent.

In the case of inject urea to the inside of the mixing pipe 300 by controlling the injection device 310, the injected urea is converted into ammonia and water, and the ammonia and water are mixed with the exhaust gas that has passed through the diesel particulate filter (DPF) 200 in the mixing pipe 300.

For uniform mixing of the reducing agent and the exhaust gas, a vortex generation structure (not illustrated) may be formed in the mixing pipe 300, and the injection device 310 may be connected to the vicinity of the vortex generation structure to inject the reducing agent.

The reducing agent and the exhaust gas that are mixed in the mixing pipe 300 flow into the selective catalytic reduction (SCR) device 400 to be described later.

On the other hand, in the same manner as the exhaust pipe 10 as described above, the mixing pipe 300 may be provided with a connection portion that is connected to one side by one or more flexible joints0 11 in order to effectively reduce the vibration due to the engine driving and to prevent deformation according to the thermal expansion. The flexible joint 11 may be made of a metal or a heat resistant elastic body.

The selective catalytic reduction (SCR) device 400 is a device that accelerates the reaction speed through selective activation of a chemical reaction only, in which the reducing agent that is mixed with the exhaust gas reacts on nitrogen oxide NOx of the exhaust gas to produce nitrogen ($N_2$) and water ($H_2O$) in the mixing pipe 300. The selective catalytic reduction (SCR) device 400 is mounted on the upper end portion of the cowl frame 100 to communicate with the other end portion of the mixing pipe 300. The selective catalytic reduction (SCR) device 400 corresponds to a secondary reduction device that removes nitrogen oxide included in the exhaust gas in which HC, CO, and particulate matters PM are reduced through the diesel particulate filter (DPF) 200.

In the same manner as the diesel particulate filter (DPF) 200, the selective catalytic reduction (SCR) device 400 may be manufactured with various sizes and shapes according to the engine output and the amount of exhaust gas. In order to effectively buffer impact due to the exhaust gas that flows in at high temperature and at high pressure, it is preferable that the selective catalytic reduction (SCR) device 400 is in a cylindrical shape, and has both end portions which are in hemispheric shapes that are opposed to each other. That is, the cross section of the selective catalytic reduction (SCR) device 400 is in an elliptical shape.

Since the selective catalytic reduction (SCR) device 400 is not mounted on the engine 2, but is installed on the upper end portion of the cowl frame 100 that is mounted on one side of the main frame 4 that is adjacent to the engine 2, it is hardly affected by the vibration due to the engine driving and the work load. Accordingly, a welded portion of the selective catalytic reduction (SCR) device 400 or a connection portion of the mixing pipe 300 can be prevented from being deformed, such as from being cracked or damaged, due to the vibrations.

In the same manner as the diesel particulate filter (DPF) 200, the selective catalytic reduction (SCR) device 400 may be fixed to the upper end portion of the cowl frame 100 through the fixing portion 500. In this case, as illustrated in FIG. 1, the diesel particulate filter (DPF) 200 and the selective catalytic reduction (SCR) device 400 may be mounted in parallel to each other in a horizontal state with respect to the length direction (upper/lower direction in FIG. 1) of the cowl frame 100, and thus the space of the upper end portion of the cowl frame 100 can be efficiently utilized. As described above, the arrangement of the diesel particulate filter (DPF) 200 and the selective catalytic reduction (SCR) device 400 as illustrated in FIG. 1 may be changed to an arrangement that is rotated at right angles on the horizontal surface.

On the other hand, the selective catalytic reduction (SCR) device 400 and the upper end portion of the cowl frame 100 may be engaged with each other by the fixing portion 500. The fixing portion 500 may include an elastic support member 510 fixed to the upper end portion of the cowl frame 100 (specifically, an upper surface of the fixing bracket 110) to support the lower end portion of the selective catalytic reduction (SCR) device 400, and fastening bands 520 provided on both end portions of the support member 510 to surround and fix outer peripheries of the selective catalytic reduction (SCR) device 400.

In this case, the support member 510 has a shape that corresponds to the outer periphery of the lower end portion of the supported selective catalytic reduction (SCR) device 400, and comes in close contact with the selective catalytic reduction (SCR) device 400. The support member 510 may be formed of heat resistant synthetic resin having elasticity to reduce the vibration due to the engine driving. At least two support members 510 may be provided to stably support the selective catalytic reduction (SCR) device 400.

A pair of fastening bands 520 may be provided to surround and fix the outer periphery of the selective catalytic reduction (SCR) device 400, and may be rotated through a hinge engagement with both end portions of the support member 510. Mutual engagement of the pair of fastening bands 520 may be performed by various engagement methods, such as screw engagement. The selective catalytic reduction (SCR) device 400 can be firmly fixed to the support member 510 through the fastening bands 520.

The catalyst that is provided inside the selective catalytic reduction (SCR) device 400 may be made of zeolite, vanadium, or a mixture including them at a predetermined rate, and the inner side surface of the selective catalytic reduction (SCR) device 400 may be coated with the catalyst to accelerate reduction reaction of nitrogen oxide in the exhaust gas.

The selective catalytic reduction (SCR) device 400 discharges the exhaust gas in which nitrogen oxide is reduced to an outside through a discharge pipe 410. In this case, it is preferable that the discharge pipe 410 is provided on an opposed side to the side on which the selective catalytic reduction (SCR) device 400 and the mixing pipe 300 are connected to each other.

As described above, the selective catalytic reduction (SCR) device 400 can reduce harmful gas, such as nitrogen oxide through acceleration of the reduction reaction of nitrogen oxide (NOx) in the exhaust gas by the medium of the reducing agent.

As described above, according to the apparatus 1 for reducing an exhaust gas for heavy equipment according to the present invention, since the selective catalytic reduction (SCR) device 400 is further provided in addition to the diesel particulate filter (DPF) 200 that is a generally used reduction device to effectively suppress nitrogen oxide (NOx), the intensified diesel engine exhaust gas regulations can be satisfied, and the environmental pollution can be prevented.

Further, since the constituent elements, such as the diesel particulate filter (DPF) 200 and the selective catalytic reduction (SCR) device 400, which are mounted on the upper end portion of the cowl frame 100, the flexible joints 11 formed on the sides of the exhaust pipe 10 and the mixing pipe 300, and the elastic support member 510, are organically combined with each other, the influence of the vibration due to the engine driving can be minimized, and thus the durability of the reduction device 1 can be greatly increased.

Further, since the diesel particulate filter (DPF) 200 and the selective catalytic reduction (SCR) device 400 are cylindrical and have both end portions which are in hemispheric shapes that are opposed to each other, impacts due to the exhaust gas that flows in at high temperature and at high pressure can be effectively buffered, and thus the durability is increased.

INDUSTRIAL APPLICABILITY

As apparent from the above description, according to the apparatus for reducing an exhaust gas for heavy equipment, the intensified diesel engine exhaust gas regulations can be satisfied through further providing of the selective catalytic reduction (SCR) device in addition to the diesel particulate filter (DPF), and the influence of vibration due to engine driving can be minimized through providing of various anti-vibration devices, such as mounting of the diesel particulate filter (DPF) and the selective catalytic reduction (SCR) device on the cowl frame.

The invention claimed is:

1. An apparatus for reducing an exhaust gas that is provided on one end portion of an exhaust pipe of which the other end portion is connected to an engine mounted on a main frame of heavy equipment, comprising:

a cowl frame mounted on one side of the main frame that is adjacent to the engine to reduce an influence due to vibration of the engine;

a diesel particulate filter (DPF) having one end portion that communicates with the other end portion of the exhaust pipe and is mounted on an upper end portion of the cowl frame, having diesel oxidation catalyst (DOC) provided therein, and capturing particulate matters;

a mixing pipe having one end portion that communicates with the other end portion of the diesel particulate filter, one side of which communicates with an injection device injecting a reducing agent; and a selective catalytic reduction (SCR) device mounted on an upper end portion of the cowl frame to communicate with the other end portion of the mixing pipe to accelerate a reduction reaction between the injected reducing agent and nitrogen oxides (NOx) in the exhaust gas;

wherein the diesel particulate filter (DPF) and the selective catalytic reduction (SCR) device are cylindrical, have both end portions which are in hemispheric shapes that are opposed to each other, and are mounted in parallel on the cowl frame.

2. The apparatus for reducing an exhaust gas according to claim 1, wherein at least one of the exhaust pipe and the mixing pipe has a connection portion that is connected by one or more flexible joints.

3. The apparatus for reducing an exhaust gas according to claim 2, wherein engagement of the cowl frame with the diesel particulate filter (DPF) and the selective catalytic reduction (SCR) device is performed through a fixing portion that includes an elastic support member fixed to the upper end portion of the cowl frame to support lower end portions of the diesel particulate filter (DPF) and the selective catalytic reduction (SCR) device, and fastening bands provided on both end portions of the support member to surround and fix outer peripheries of the diesel particulate filter (DPF) and the selective catalytic reduction (SCR) device.

\* \* \* \* \*